United States Patent [19]

Yamamoto et al.

[11] Patent Number: 5,193,843
[45] Date of Patent: Mar. 16, 1993

[54] SUSPENSION SYSTEM OF A VEHICLE

[75] Inventors: Tadanobu Yamamoto, Higashi-Hiroshima; Hiroyoshi Kumada, Hiroshima, both of Japan

[73] Assignee: Mazda Motor Corp., Hiroshima, Japan

[21] Appl. No.: 674,266

[22] Filed: Mar. 25, 1991

[30] Foreign Application Priority Data

Mar. 30, 1990 [JP] Japan .................... 2-91381

[51] Int. Cl.⁵ ................................. B60G 3/20
[52] U.S. Cl. .................................. 280/675
[58] Field of Search ............... 280/675, 691, 668, 724, 280/725, 726, 673, 660, 688, 690, 701, 96.1

[56] References Cited

U.S. PATENT DOCUMENTS

| 4,819,959 | 4/1989 | Inoue et al. | 280/660 |
| 4,863,188 | 9/1989 | Killian | 280/675 |
| 5,048,860 | 9/1991 | Kanai et al. | 280/675 |

FOREIGN PATENT DOCUMENTS

| 265959 | 5/1988 | European Pat. Off. | |
| 289889 | 11/1988 | European Pat. Off. | |
| 1938851 | 8/1970 | Fed. Rep. of Germany. | |
| 2255679 | 5/1974 | Fed. Rep. of Germany. | |
| 3826930 | 3/1989 | Fed. Rep. of Germany. | |
| 64-26507 | 2/1989 | Japan. | |
| 0144207 | 6/1990 | Japan | 280/691 |
| 2106460 | 4/1983 | United Kingdom. | |
| 2198997 | 6/1988 | United Kingdom | 280/691 |

Primary Examiner—Tamara L. Graysay
Attorney, Agent, or Firm—Keck, Mahin & Cate

[57] ABSTRACT

A suspension system for a vehicle includes a steering knuckle for supporting a wheel which is used for steering and also for driving, an upper arm for connecting an upper portion of the steering knuckle to a frame of the vehicle, and a lower arm for connecting a lower portion of the steering knuckle to a frame of the vehicle. At least one of the arms includes two link members. Each of the link members is pivotally connected to the frame of the vehicle at one end thereof and to the steering knuckle at an opposite end thereof. The link members are so disposed as to set a transverse distance between a kingpin axis and a center of the wheel at a positive value such that the kingpin axis is located inside of the center of the wheel in relation to a transverse direction of the vehicle, and reduce the distance as the wheel is turned toward an outward direction wherein the wheel is located radially outwardly in relation to a turning circle.

17 Claims, 5 Drawing Sheets

SUSPENSION SYSTEM OF A VEHICLE

BACKGROUND OF THE INVENTION

1. Field of the invention

The present invention relates to a suspension system for anchoring wheels which are used for steering and also for driving to a frame of a vehicle.

2. Description of the prior art

Hereinafter, a fore to aft direction of the vehicle is called a "longitudinal" direction, and a side to side direction of the vehicle is called a "transverse" direction. Also, a location near a centerline of the vehicle is called an "inside" location and a location distant from a centerline of the vehicle is called an "outside" location.

There has been known a double pivot type suspension system for a vehicle. For example, Japanese Utility Model Laid-Open Publication No. 64-26507 shows such a type of suspension system. This type of suspension system comprises a steering knuckle for supporting a wheel, and an upper arm and a lower arm, respectively, connecting an upper portion and a lower portion of the steering knuckle to a frame of a vehicle. At least one of the arms comprises two link members, each of which is pivotally connected to the frame at a respective one end thereof, and to the steering knuckle at a respective opposite end thereof.

In this type of suspension system, a kingpin axis, which is an axis around which a wheel used for steering is turned, extends through a cross point between the axis of the two link members. The kingpin axis moves in response to the movement of the cross point in a horizontal plane during steering of the vehicle. A transverse distance between the kingpin axis and the center of the wheel is generally set at a positive value. In other words, the kingpin axis is located inside of the wheel center in a transverse direction.

In a FF (front-engine-front-drive) vehicle, when the vehicle is accelerated when it is being turned, a front wheel, which is located radially outwardly in relation to a turning circle, is provided with a momentum by a driving force acting on the wheel, so that the front wheel is pivoted toward the turning direction around the kingpin axis. Thus, the vehicle is excessively turned, which decreases the stability of the vehicle.

SUMMARY OF THE INVENTION

It is, therefore, the object of the present invention to provide a double pivot type suspension system for a vehicle in which the vehicle is stabilized against acceleration during turning.

In accordance with the present invention, there is provided a suspension system for a vehicle which comprises a steering knuckle for supporting a wheel which is used for steering and also for driving, an upper arm for connecting an upper portion of the steering knuckle to a frame of the vehicle, and a lower arm for connecting a lower portion of the steering knuckle to the frame of the vehicle. At least one of the arms includes two link members. Each of the link members is pivotally connected to the frame of the vehicle at one end thereof and to the steering knuckle at an opposite end thereof. The link members are disposed so as to set a transverse distance between a kingpin axis and the center of the wheel at a positive value such that the kingpin axis is located inside of the center of the wheel in relation to a transverse direction of the vehicle, and reduce the distance as the wheel is turned toward an outward direction so that the wheel is located radially outwardly in relation to a turning circle.

In a preferable aspect of the present invention, there is provided a suspension system for a vehicle which comprises a steering knuckle for supporting a wheel which is used for steering and also for driving, an upper arm for connecting an upper portion of the steering knuckle to a frame of the vehicle, and a lower arm for connecting a lower portion of the steering knuckle to the frame of the vehicle. At least one of the arms includes two link members. Each of the link members is pivotally connected to the frame of the vehicle at one end thereof and to the steering knuckle at an opposite end thereof. The link members are disposed so as to set a transverse distance between a kingpin axis and the center of the wheel at a positive value such that the kingpin axis is located inside of the center of the wheel in relation to a transverse direction of the vehicle, and reduce the distance as the wheel is turned toward an inward direction so that the wheel is located radially inwardly in relation to a turning circle as well as an outward direction in which the wheel is located radially outwardly in relation to the turning circle.

In another preferable aspect of the present invention, there is provided a suspension system for a vehicle which comprises a steering knuckle for supporting a wheel which is used for steering and also for driving, an upper arm for connecting an upper portion of the steering knuckle to a frame of the vehicle, and a lower arm for connecting a lower portion of the steering knuckle to the frame of the vehicle, at least one of the arms includes two link members. Each of the link members is pivotally connected to the frame of the vehicle at one end thereof and to the steering knuckle at an opposite end thereof. The link members are disposed so as to set a transverse distance between a kingpin axis and the center of the wheel at a positive value such that the kingpin axis is located inside of the center of the wheel in relation to a transverse direction of the vehicle, and maximize the distance when the wheel is turned at a predetermined angle toward an inward direction so that the wheel is located radially inwardly in relation to a turning circle.

According to the present invention, the two link members are so disposed as to set a transverse distance between a kingpin axis and the center of the wheel at a positive value such that the kingpin axis is located inside of the center of the wheel in relation to a transverse direction of the vehicle, and reduce the distance as the wheel is turned toward an outward direction so that the wheel is located radially outwardly in relation to a turning circle from the neutral position of the wheel. Thus, when the vehicle is accelerated during the turning of the same, a momentum, due to a driving force working on the wheel, which rotates the wheel being turned toward the outward direction in the turning direction around the kingpin axis, decreases as the wheel is turned to the turning direction. Consequently, the excessive turning of the vehicle is restricted and the safety of the vehicle is enhanced.

The safety of the vehicle is much more enhanced if the two link members are disposed so as to set a transverse distance between a kingpin axis and the center of the wheel at a positive value such that the kingpin axis is located inside of the center of the wheel in relation to a transverse direction of the vehicle, and maximize the distance when the wheel is turned at a predetermined angle toward an inward direction in which the wheel is located radially inwardly in relation to a turning circle. In this case, as the distance is maximized when the wheel is turned toward an inward direction from a neutral position, the distance decreases rapidly when the wheel is turned toward an outward direction so that the wheel is located radially outwardly in relation to a turning circle from the neutral position. Consequently, the excessive turning of the vehicle is remarkably restricted and the safety of the vehicle is enhanced even more.

The above and other objects and features of the present invention will become apparant from the following description of the preferred embodiments when considered in conjunction with reference to the accompanying drawings.

DESCRIPTION OF THE PREFERED EMBODIMENTS

Figure 1:
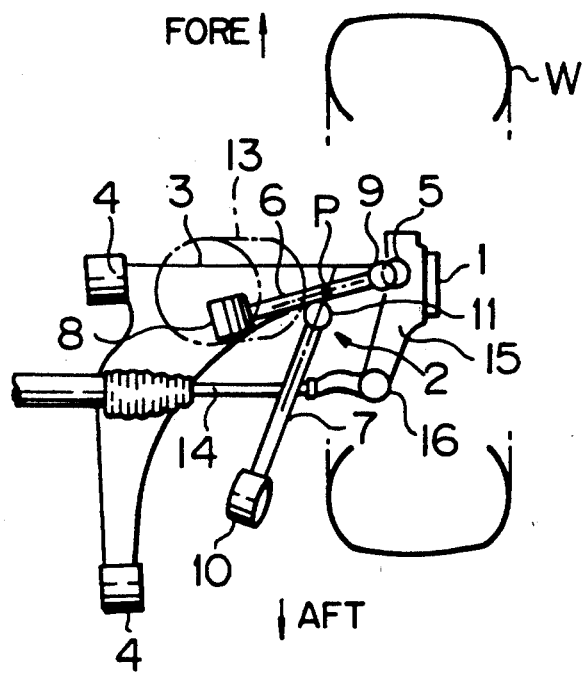
FIG. 1 is a plan view of a suspension system in accordance with a first embodiment of the present invention.
Figure 2:
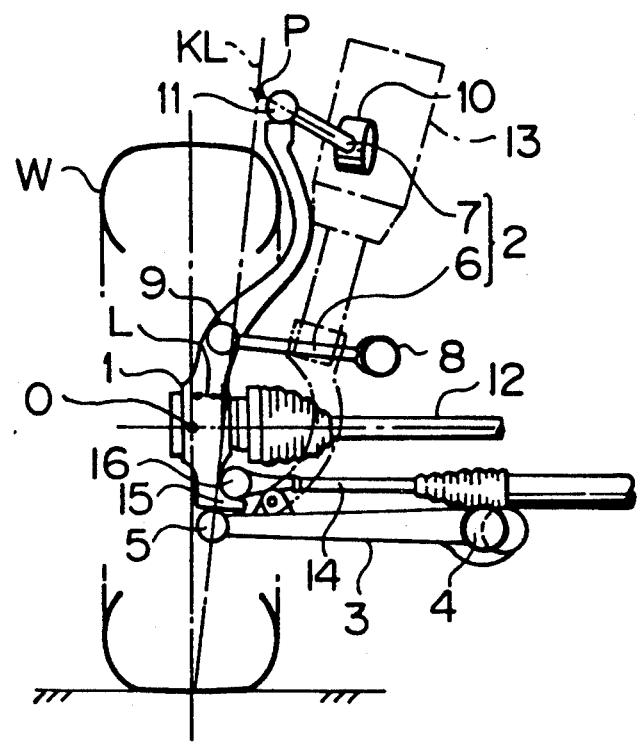
FIG. 2 is a front view of a suspension system in accordance with the first embodiment of the present invention.
Figure 3:
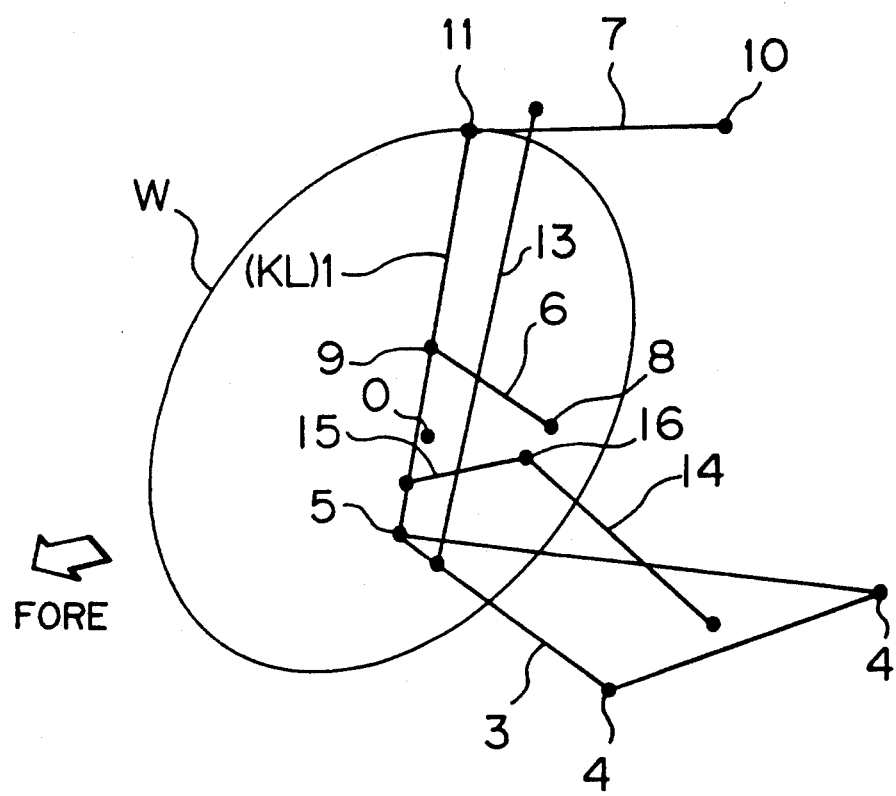
FIG. 3 is a schematic perspective view showing a general arrangement of the suspension system of the first embodiment of the present invention.

Referring to FIGS. 1 to 3, there is shown a suspension system according to a first embodiment of the present invention. The suspension system is for anchoring a right front wheel W, which is used for steering and also for driving, of a FF (front-engine-front-drive) vehicle, to the frame of the vehicle.

In FIGS. 1 to 3, a steering knuckle 1 supporting the wheel W is connected to and supported by the frame of the vehicle ( not shown) at an upper portion thereof through an upper arm 2, while being connected to and supported by the frame of the vehicle ( not shown) at a lower portion thereof through a lower arm 3. The lower arm 3 has an A shaped configuration. Two end points of the A shaped lower arm 3 are aligned in substantially a longitudinal direction of the vehicle, and respectively connected to and supported by the frame of the vehicle for vertical pivotal motion through rubber bushings 4, 4. The apex of the A shaped lower arm 3 is rotatably connected to the steering knuckle 1 through a ball joint 5.

The upper arm 2 comprises two link members 6, 7. The link member 6 is disposed in substantially a transverse direction of the vehicle. The link member 6 is connected to the frame of the vehicle through a rubber bush 8 at one end thereof and pivotally connected to the steering knuckle 1 through a ball joint 9 at an opposite end thereof. The link member 7 is disposed above the link member 6 and in substantially a longitudinal direction of the vehicle. The link member 7 is connected to the frame of the vehicle through a rubber bush 10 at one end thereof and pivotally connected to the steering knuckle 1 through a ball joint 11 at an opposite end thereof. As shown in FIG. 1, in a plan view, the link member 7 is disposed such that its axis, when extended, crosses an axis of the link member 6 at point P on the axis of the link member 7. Moreover, the link member 7 is located to the rear of the cross point P in relation to the longitudinal direction of the vehicle. Though not shown in FIG. 1, the rubber bushes 8, 10, respectively, comprise an inner cylinder, an outer cylinder and a rubber placed into a space between the two cylinders. Thus, the link members 6, 7 can pivot horizontally within a limited angle determined by the resiliency of the rubber bushes 8, 10, and they can rotate around the axes of the rubber bushes 8, 10. In other words, the link members 6 and 7 can pivot upward and downward.

In FIG. 2, there is also shown a drive shaft 12 and a shock absorber 13. The shock absorber 13 is connected to the lower arm 3 at a lower end thereof and to the frame of the vehicle at an upper end thereof. A tie rod 14 of the steering system is connected to a steering arm 15 protruding from the steering knuckle 1 through a ball joint 16. Thus, under a steering force provided through the tie rod 14, the front wheel W, integrally with the steering knuckle 1, turns around a kingpin axis KL.

The kingpin axis KL extends from a cross point between the lower arm 3 and the steering knuckle 1, ie., the center of the ball joint 5, to the point P on the axis of the link member 7 where, in a plan view, the axis of the link member 6 and the axis of the link member 7 cross each other. A transverse distance L between the kingpin axis KL and a wheel center 0 of the front wheel W varies as the cross point P moves in response to the turning of the front wheel W.

Figure 4:
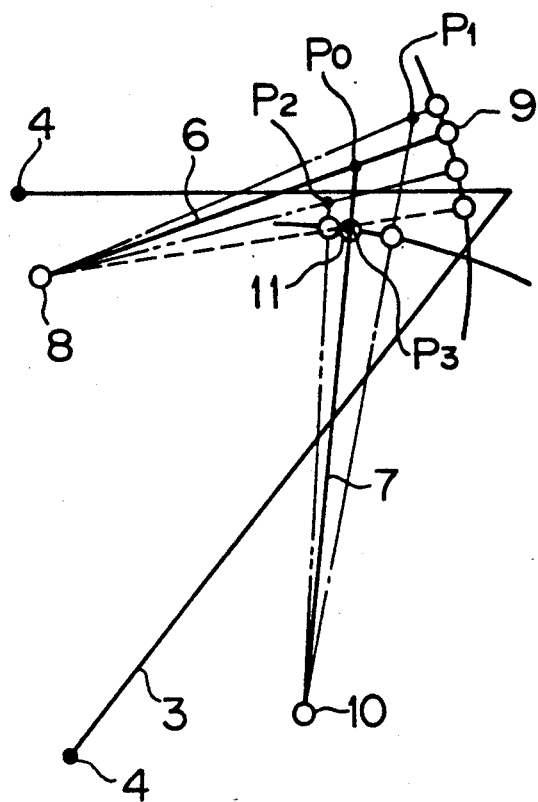
FIG. 4 is a schematic plan view of the arrangement of FIG. 3.

The movement of the cross point P in response to the turning of the front wheel W will be described hereinafter with reference to FIG. 4. In FIG. 4, the link members 6, 7 are indicated by solid lines when the front wheel W is in the neutral position, and by dashed lines when the front wheel W is turned in a direction wherein the wheel W is positioned radially outwardly in relation to a turning circle of the vehicle, that is, the front wheel W is turned so as to turn the vehicle to the left in this embodiment. Hereinafter, this direction is called an outward direction. The link members are further indicated by two-dot chain lines when the front wheel W is turned in a direction so that the wheel W is positioned radially inwardly in relation to a turning circle of the vehicle, that is, the front wheel W is turned so as to turn the vehicle to the right in this embodiment. Hereinafter, this direction is called an inward direction. Finally, the link members are indicated by broken lines when the front wheel W is excessively turned to the inward direction.

Figure 5:
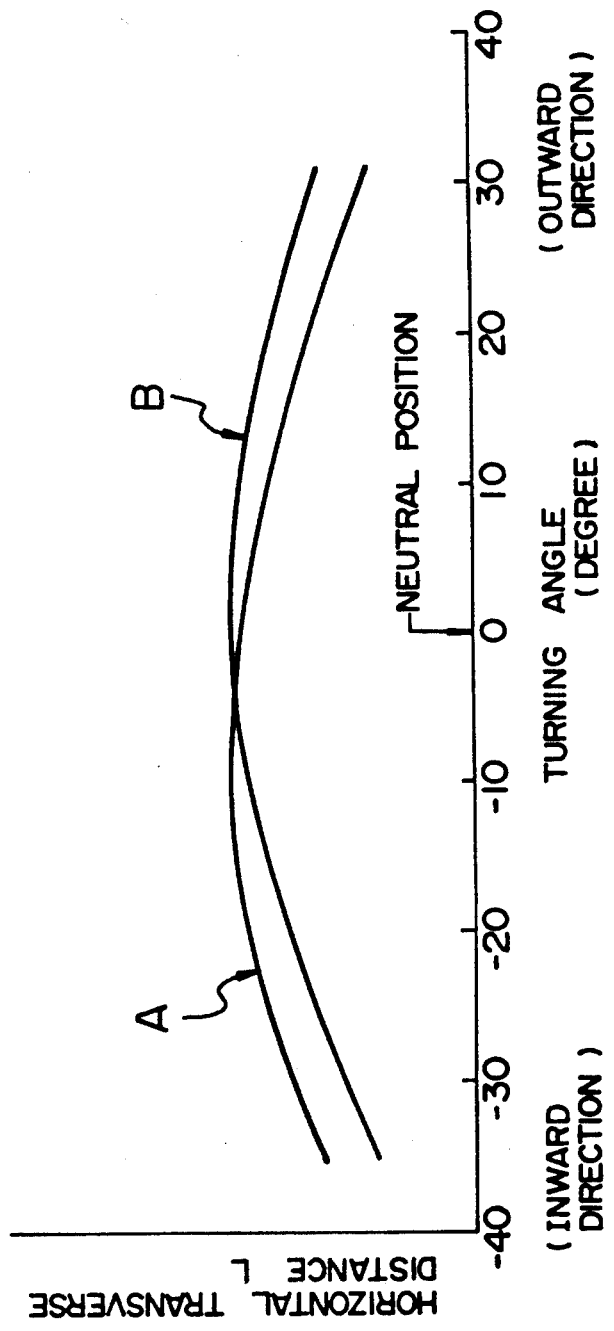
FIG. 5 is a diagram showing variations in a transverse distance between a kingpin axis and the center of a wheel.

As understood from FIG. 4, the link members 6, 7 of the upper arm 2 horizontally pivot around their respective connection points to the frame of the vehicle, ie., the rubber bushes 8, 10, in response to the turning of the front wheel W. Thus the cross point P between the link members 6 and 7 moves along the axis of the link member 6. More specifically, when the front wheel W is turned to the outward direction from the neutral position, the cross point P moves to the outside of the vehicle along the link member 6 ($P_0$ to $P_1$). When the front wheel W is turned to the inward direction from the neutral position, the cross point P moves to the inside of the vehicle along the link member 6 ($P_0$ to $P_1$). However, this movement of the cross point P to the inside of the vehicle ceases when the cross point P overlaps the connection point of the link member 7 with the steering knuckle 1, ie., the ball joint 11. When the front wheel W is still further turned to the inward direction, the cross point P moves to the outside along the link member 6 ($P_2$ to $P_3$). Thus, the transverse distance L between the kingpin axis KL and the wheel center 0 of the front wheel W, as denoted by a line A in FIG. 5, is within a positive value such that the kingpin axis KL lies inside of the wheel center 0 of the front wheel W in relation to the transverse direction of the vehicle. The transverse distance L becomes a maximum when the front wheel W is turned to the inward direction to such an extent that the cross point P overlaps the connection point of the link member 7 with the steering knuckle 1, ie., the ball joint 11. When the front wheel W is still further turned to the inward direction, or when the front wheel W is turned to the outward direction, the transverse distance L decreases substantially along a quadratic curve.

As described above, link members 6, 7 are so disposed as to reduce the transverse distance L between the kingpin axis KL and the wheel center O of the front wheel W when the front wheel W is turned to the outward direction from the neutral position. Thus, when the vehicle is accelerated during the turning of the same, a momentum due to a driving force working on the wheel, which rotates the front wheel W being turned to the outward direction to the turning direction around the kingpin axis KL, decreases as the front wheel W is turned in the turning direction, so that excessive turning of the vehicle is restricted and the safety of the vehicle is enhanced.

In this embodiment, as the distance L is maximized when the front wheel W is turned to the inward direction from the neutral position, the distance L decreases rapidly when the front wheel W is turned to the outward direction from the neutral position, so that excessive turning of the vehicle is remarkably restricted and the safety of the vehicle is even more enhanced.

Figure 6:
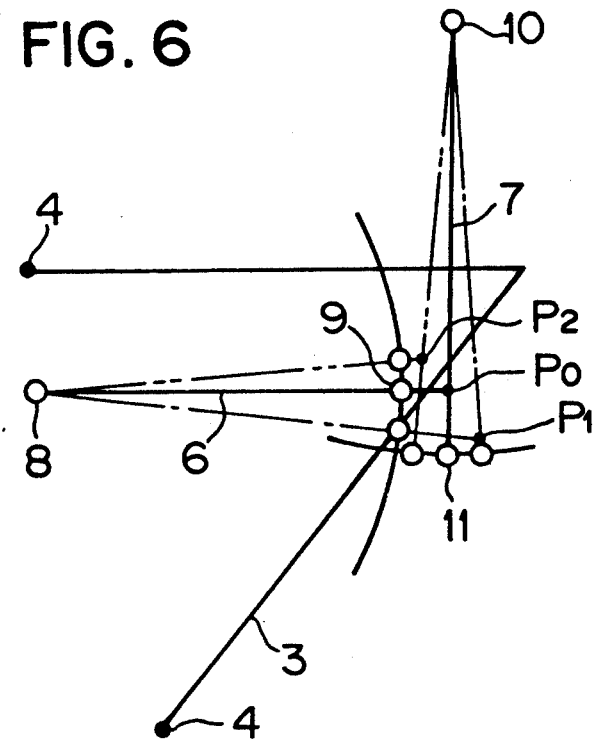
FIG. 6 is a schematic plan view of a general arrangement of a suspension system of a second embodiment of the present invention.

FIG. 6 shows a second embodiment of the present invention. In this embodiment, the link member 6 is disposed transversely, and the link member 7 is disposed longitudinally. As shown in FIG. 6, in a plan view, the link member 6 is disposed such that its axis, when extended to the outside, crosses an axis of the link member 7 at point P on the axis of the link member 7. Moreover, the link member 7 is located in front of the cross point P in relation to the longitudinal direction of the vehicle.

When the front wheel W is turned from the neutral position in the outward direction, the cross point P moves along the axis of the link member 7. The link member 7 pivots to the outside of the vehicle around the connection point thereof with the frame of the vehicle, ie., the rubber bush 10, when the front wheel W is turned from the neutral position to the outward direction, and pivots to the inside of the vehicle when the front wheel W is turned from the neutral position to the inward direction. Thus, the cross point P moves to the outside of the vehicle when the front wheel W is turned from the neutral position to the outward direction ($P_0$ to $P_1$), while it moves to the inside of the vehicle when the front wheel W is turned from the neutral position to the inward direction ($P_0$ to $P_2$). However, if the front wheel W is turned to the inward direction so as to exceed the position where the cross point P overlaps the connection point of the link member 6 with the steering knuckle 1, ie., the ball joint 9, the cross point P moves to the outside.

As a result, as in the first embodiment, the transverse distance L between the kingpin axis KL and the wheel center 0 of the front wheel W, as denoted by a line A in FIG. 5, is within a positive value such that the kingpin axis KL lies inside of the wheel center 0 of the front wheel W in relation to the transverse direction of the vehicle. The transverse distance L is maximized when the front wheel W is turned to the inward direction to such an extent that the cross point P overlaps the connection point of the link member 6 with the steering knuckle 1, ie., the ball joint 9. When the front wheel W is still further turned to the inward direction, or when the front wheel W is turned to the outward direction, the transverse distance L decreases substantially along a quadratic curve. Thus, excessive turning of the vehicle is restricted when it is acclerated during the turning of the same, and the safety of the vehicle is enhanced.

Figure 7:
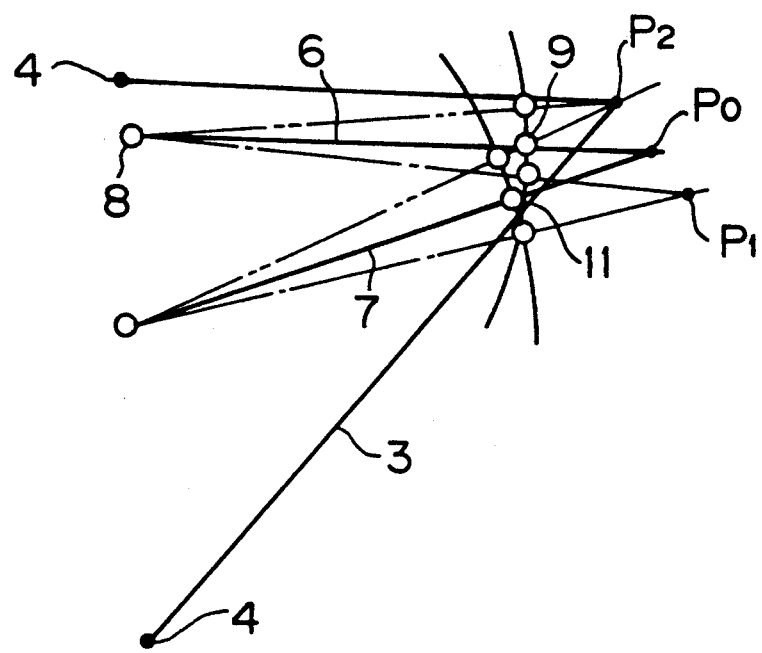
FIG. 7 is a schematic plan view of a general arrangement of a suspension system of a third embodiment of the present invention.

FIG. 7 shows a third embodiment of the present invention. In this embodiment, the link member 6 is disposed transversely, and the link member 7 is disposed longitudinally and obliquely. As shown in FIG. 7, in a plan view, the link members 6 and 7 are disposed such that their axes, when extended to the outside of the vehicle, cross each other. Moreover, the link member 7 is located to the rear of the cross point P in relation to the longitudinal direction of the vehicle.

Thus, the cross point P moves to the outside of the vehicle when the front wheel W is turned from the neutral position in the outward direction ($P_0$ to $P_1$), while it moves to the inside of the vehicle when the front wheel W is turned from the neutral position in the inward direction ($P_0$ to $P_2$). However, if the front wheel W is turned to the inward direction so as to exceed the position where the cross point P overlaps the connection point of the link member 6 with the steering knuckle 1, ie., the ball joint 9, the cross point P moves to the outside.

As a result, the same as in the first embodiment, the transverse distance L between the kingpin axis KL and the wheel center 0 of the front wheel W, as denoted by a line A in FIG. 5, is within a positive value such that the kingpin axis KL lies inside of the wheel center O of the front wheel W in relation to the transverse direction of the vehicle. The transverse distance L is maximized when the front wheel W is turned to the inward direction to such an extent that the cross point P overlaps the connection point of the link member 6 with the steering knuckle 1, ie., the ball joint 9. When the front wheel W is still further turned to the inward direction, or when the front wheel W is turned to the outward direction, the transverse distance L decreases substantially along a quadratic curve.

Figure 8:
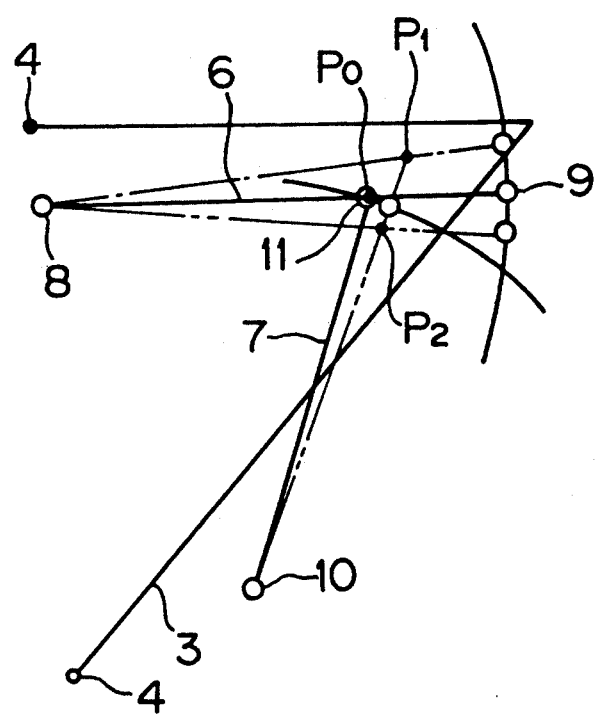
FIG. 8 is a schematic plan view of a general arrangement of a suspension system of a fourth embodiment of the present invention.

FIG. 8 shows a fourth embodiment of the present invention. In this embodiment, the disposition of the link members 6 and 7 is almost the same as in the first embodiment. However, in this embodiment, when the front wheel W is in the neutral position, the connection point of the link member 7 with the steering knuckle 1, ie., the ball joint 11, is located on the axis of the link member 6 in a plan view. In other words, the cross point P is located on the axis of the link member 7 in a plan view when the front wheel W is in the neutral position.

Thus, the cross point P moves to the outside of the vehicle when the front wheel W is turned from the neutral position to the outward direction ($P_0$ to $P_1$). Also, the cross point P moves to the outside of the vehicle when the front wheel W is turned from the neutral position to the inward direction ($P_0$ to $P_2$).

As a result, the transverse distance L between the kingpin axis KL and the wheel center O of the front wheel W, as denoted by a line B in FIG. 5, is within a positive value such that the kingpin axis KL lies inside of the wheel center O of the front wheel W in relation to the transverse direction of the vehicle. The transverse distance L is maximized when the front wheel W is in the neutral position. When the front wheel W is turned in the inward direction or outward direction from the neutral position, the transverse distance L decreases substantially along a quadratic curve.

In the aforementioned embodiments, the upper arm 2 comprises the two link members 6 and 7. The present invention is also effective when the lower arm 2 comprises two link members. In this case, the longitudinally disposed link member should be on the side of the cross point which is opposite to the side thereof in the aforementioned embodiments.

We claim:

1. A suspension system for a vehicle comprising:
   a steering knuckle for supporting a wheel which is used for steering and also for driving;
   an upper arm for connecting an upper portion of the steering knuckle to a frame of the vehicle;
   a lower arm for connecting a lower portion of the steering knuckle to a frame of the vehicle;
   at least one of said arms comprising two link members, each of said link members being pivotally connected to the frame of the vehicle at one end thereof and to the steering knuckle at an opposite end thereof;
   said link members being so disposed as to set a transverse distance between a kingpin axis and a center of the wheel at a positive value wherein the kingpin axis is located inside of the center of the wheel in relation to a transverse direction of the vehicle, and reduce the distance as the wheel is turned toward an inward direction wherein the wheel is located radially inwardly in relation to a turning circle as well as an outward direction wherein the wheel is located radially outwardly in relation to the turning circle.

2. A suspension system for a vehicle in accordance with claim 1, wherein:
   said upper arm comprises said two link members;
   one of the link members being disposed in a transverse direction;
   the other link members being disposed in a longitudinal direction;
   the two link members being disposed such that, in a neutral position of the wheel, a connection point of the longitudinally disposed link member with the steering knuckle is located on an axis of the transversely disposed link member in a plan view of the disposition of the link members; and,
   the longitudinally disposed link member being located to the rear of the transversely disposed link member.

3. A suspension system for a vehicle in accordance with claim 1, wherein:
   said lower arm comprises said two link members;
   one of the link members being disposed in a transverse direction;
   the other link member being disposed in a longitudinal direction;
   the two link members being disposed such that, in a neutral position of the wheel, a connection point of the longitudinally disposed link member with the steering knuckle is located on an axis of the transversely disposed link member in a plan view of the disposition of the link members; and,
   the longitudinally disposed link member being located in front of the transversely disposed link member.

4. A suspension system for a vehicle comprising:
   a steering knuckle for supporting a wheel which is used for steering and also for driving;
   an upper arm for connecting an upper portion of the steering knuckle to a frame of the vehicle; and
   a lower arm for connecting a lower portion of the steering knuckle to a frame of the vehicle; wherein
   at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle, and reduce the distance as the wheel is turned toward an outward direction wherein the wheel is located radially outwardly in relation to a turning circle, said upper arm comprises said two link members, one of the link members being disposed in a transverse direction and the other link member being disposed in a longitudinal direction, the two link members are disposed such that an extended portion of an axis of the longitudinally disposed link member crosses an axis of the transversely disposed link member in a plan view of the link member, and the longitudinally disposed link member is located to the rear of the cross point.

5. A suspension system for a vehicle comprising:
   a steering knuckle for supporting a wheel which is used for steering and also for driving;
   an upper arm for connecting an upper portion of the steering knuckle to a frame of the vehicle; and
   a lower arm for connecting a lower portion of the steering knuckle to a frame of the vehicle; wherein
   at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle, and reduce the distance as the wheel is turned toward an outward direction wherein the wheel is located radially outwardly in relation to a turning circle, said lower arm comprises said two link members, one of the link members being disposed in a transverse direction and the other link member being disposed in a longitudinal direction, the two link members are disposed such that an extended portion of an axis of the longitudinally disposed link member crosses an axis of the transversely disposed link member in a plan view of the link members, and the longitudinally disposed link member is located in front of the cross point.

6. A suspension system for a vehicle comprising:
a steering knuckle for supporting a wheel which is used for steering and also for driving;
an upper arm for connecting an upper portion of the steering knuckle to a frame of the vehicle; and
a lower arm for connecting a lower portion of the steering knuckle to a frame of the vehicle; wherein
at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle, and reduce the distance as the wheel is turned toward an outward direction wherein the wheel is located radially outwardly in relation to a turning circle, said upper arm comprises said two link members, one of the link members being disposed in a transverse direction and the other link member being disposed in a longitudinal direction, the two link members are disposed such that a portion of an axis of the transversely disposed link member extended to an outside of the vehicle crosses an axis of the longitudinally disposed link member in a plan view of the link members, and the longitudinally disposed link member is located in front of the cross point.

7. A suspension system for a vehicle comprising:
a steering knuckle for supporting a wheel which is used for steering and also for driving;
an upper arm for connecting an upper portion of the steering knuckle to a frame of the vehicle; and
a lower arm for connecting a lower portion of the steering knuckle to a frame of the vehicle; wherein
at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle, and reduce the distance as the wheel is turned toward an outward direction wherein the wheel is located radially outwardly in relation to a turning circle, said lower arm comprises said two link members, one of the link members being disposed in a transverse direction and the other link member being disposed in a longitudinal direction, the two link members are disposed such that a portion of an axis of the transversely disposed link member extended to an outside of the vehicle crosses an axis of the longitudinally disposed link member in a plan view of the link members, and the longitudinally disposed link member is located to the rear of the cross point.

8. A suspension system for a vehicle comprising:
a steering knuckle for supporting a wheel which is used for steering and also for driving;
an upper arm for connecting an upper portion of the steering knuckle to a frame of the vehicle; and
a lower arm for connecting a lower portion of the steering knuckle to a frame of the vehicle; wherein
at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle, and reduce the distance as the wheel is turned toward an outward direction wherein the wheel is located radially outwardly in relation to a turning circle, said upper arm comprises said two link members, one of the link members being disposed in a transverse direction and the other link member being disposed obliquely in a longitudinal direction, the two link members are disposed such that a portion of an axis of the transversely disposed link member extended to an outside of the vehicle crosses a portion of an axis of the longitudinally and obliquely disposed link member extended to the outside of the vehicle in a plan view of the link members, and the longitudinally and obliquely disposed link member is located to the rear of the cross point.

9. A suspension system for a vehicle comprising:
a steering knuckle for supporting a wheel which is used for steering and also for driving;
an upper arm for connecting an upper portion of the steering knuckle to a frame of the vehicle; and
a lower arm for connecting a lower portion of the steering knuckle to a frame of the vehicle; wherein
at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle, and reduce the distance as the wheel is turned toward an outward direction wherein the wheel is located radially outwardly in relation to a turning circle, said lower arm comprises said two link members, one of the link members being disposed in a transverse direction and the other link member being disposed obliquely in a longitudinal direction, the two link members are disposed such that a portion of an axis of the transversely disposed link member extended to an outside of the vehicle crosses a portion of an axis of the longitudinally and obliquely disposed link member extended to the outside of the vehicle in a plan view of the link members, and the longitudinally and obliquely disposed link member is located in front of the cross point.

10. A suspension system for a vehicle comprising:
a steering knuckle for supporting a wheel which is used for steering and also for driving;
an upper arm for connecting an upper portion of the steering knuckle to a frame of the vehicle; and
a lower arm for connecting a lower portion of the steering knuckle to a frame of the vehicle; wherein
at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle, and reduce the distance as the wheel is turned toward an outward direction wherein the wheel is located radially outwardly in relation to a turning circle, said upper arm comprises said two link members, one of the link members being disposed in a transverse direction and the other link member being disposed in a longitudinal direction, the two link members are disposed such that, in a neutral position of the wheel, a connection point of the longitudinally disposed link member with the steering knuckle is located on an axis of the transversely disposed link member in a plan view of the link members, and the longitudinally disposed link member is located to the rear of the transversely disposed link member.

11. A suspension system for a vehicle comprising:
a steering knuckle for supporting a wheel which is used for steering and also for driving;
an upper arm for connecting an upper portion of the steering knuckle to a frame of the vehicle; and
a lower arm for connecting a lower portion of the steering knuckle to a frame of the vehicle; wherein
at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle, and reduce the distance as the wheel is turned toward an outward direction wherein the wheel is located radially outwardly in relation to a turning circle, said lower arm comprises said two link members, one of the link members being disposed in a transverse direction and the other link member being disposed in a longitudinal direction, the two link members are disposed such that, in a neutral position of the wheel, a connection point of the longitudinally disposed link member with the steering knuckle is located on an axis of the transversely disposed link member in a plan view of the link members, and the longitudinally disposed link member is located in front of the transversely disposed link member.

12. A suspension system for a vehicle comprising:
a steering knuckle for supporting a wheel which is used for steering and also for driving;
an upper arm for connecting an upper portion of the steering knuckle to a frame of the vehicle; and
a lower arm for connecting a lower portion of the steering knuckle to a frame of the vehicle; wherein
at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle and maximize the distance when the wheel is turned at a predetermined angle toward an inward direction wherein the wheel is located radially inwardly in relation to a turning circle, and said upper arm comprises said two link members;
one of the link members being disposed in a transverse direction;
the other link member being disposed in a longitudinal direction;
the two link members being disposed such that an extended portion of an axis of the longitudinally disposed link member crosses an axis of the transversely disposed link member in a plan view of the disposition of the link members;
the longitudinally disposed link member being located to the rear of the cross point; and
a connection point of the longitudinally disposed link member with the steering knuckle overlapping the axis of the transversely disposed link member in the plan view of the disposition of the link members when the wheel is turned at a predetermined angle toward an inward direction wherein the wheel is located radially inwardly in relation to a turning circle.

13. A suspension system for a vehicle comprising:
a steering knuckle for supporting a wheel which is used for steering and also for driving;
an upper arm for connecting an upper portion of the steering knuckle to a frame of the vehicle; and
a lower arm for connecting a lower portion of the steering knuckle to a frame of the vehicle; wherein
at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle and maximize the distance when the wheel is turned at a predetermined angle toward an inward direction wherein the wheel is located radially inwardly in relation to a turning circle, and said lower arm comprises said two link members;
one of the link members being disposed in a transverse direction;
the other link member being disposed in a longitudinal direction;
the two link members being disposed such that an extended portion of an axis of the longitudinally disposed link member crosses an axis of the transversely disposed link member in a plan view of the disposition of the link members;
the longitudinally disposed link member being located in front of the cross point; and
a connection point of the longitudinally disposed link member with the steering knuckle overlapping the axis of the transversely disposed link member in the plan view of the disposition of the link members when the wheel is turned at a predetermined angle toward an inward direction wherein the wheel is located radially inwardly in relation to a turning circle.

14. A suspension system for a vehicle comprising:
a steering knuckle for supporting a wheel which is used for steering and also for driving;

an upper arm for connecting an upper portion of the steering knuckle to a frame of the vehicle; and a lower arm for connecting a lower portion of the steering knuckle to a frame of the vehicle; wherein at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle and maximize the distance when the wheel is turned at a predetermined angle toward an inward direction wherein the wheel is located radially inwardly in relation to a turning circle, and said upper arm comprises said two link members;

one of the link members being disposed in a transverse direction;

the other link member being disposed in a longitudinal direction;

the two link members being disposed such that a portion of an axis of the transversely disposed link member extended to an outside of the vehicle crosses an axis of the longitudinally disposed link member in a plan view of the disposition of the link members;

the longitudinally disposed link member being located in front of the cross point; and a connection point of the transversely disposed link member with the steering knuckle overlapping the axis of the longitudinally disposed link member in the plan view of the disposition of the link members when the wheel is turned at a predetermined angle toward an inward direction wherein the wheel is located radially inwardly in relation to a turning circle.

15. A suspension system for a vehicle comprising:

a steering knuckle for supporting a wheel which is used for steering and also for driving;

an upper arm for connecting an upper portion of the steering knuckle to a frame of the vehicle; and a lower arm for connecting a lower portion of the steering knuckle to a frame of the vehicle; wherein at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle and maximize the distance when the wheel is turned at a predetermined angle toward an inward direction wherein the wheel is located radially inwardly in relation to a turning circle, and said lower arm comprises said two link members;

one of the link members being disposed in a transverse direction;

the other link member being disposed in a longitudinal direction;

the two link members being disposed such that a portion of an axis of the transversely disposed link member extended to an outside of the vehicle crosses an axis of the longitudinally disposed link member in a plan view of the disposition of the link members;

the longitudinally disposed link member being located to the rear of the cross point; and a connection point of the transversely disposed link member with the steering knuckle overlapping the axis of the longitudinally disposed link member in the plan view of the disposition of the link members when the wheel is turned at a predetermined angle toward an inward direction wherein the wheel is located radially inwardly in relation to a turning circle.

16. A suspension system for a vehicle comprising:

a steering knuckle for supporting a wheel which is used for steering and also for driving;

an upper arm for connecting an upper portion of the steering knuckle to a frame of the vehicle; and a lower arm for connecting a lower portion of the steering knuckle to a frame of the vehicle; wherein at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle and maximize the distance when the wheel is turned at a predetermined angle toward an inward direction wherein the wheel is located radially inwardly in relation to a turning circle, and said upper arm comprises said two link members;

one of the link members being disposed in a transverse direction;

the other link member being disposed obliquely in a longitudinal direction;

the two link members being disposed such that a portion of an axis of the transversely disposed link member extended to an outside of the vehicle crosses a portion of an axis of the longitudinally and obliquely disposed link member extended to the outside of the vehicle in a plan view of the disposition of the link members;

the longitudinally and obliquely disposed link member being located to the rear of the cross point; and a connection point of the longitudinally and obliquely disposed link member with the steering knuckle overlapping the axis of the transversely disposed link member in the plan view of the disposition of the link members when the wheel is turned at a predetermined angle toward an inward direction wherein the wheel is located radially inwardly in relation to a turning circle.

17. A suspension system for a vehicle comprising:

a steering knuckle for supporting a wheel which is used for steering and also for driving;

an upper arm for connecting an upper portion of the steering knuckle to a frame of the vehicle; and a lower arm for connecting a lower portion of the steering knuckle to a frame of the vehicle; wherein at least one of said arms comprises two link members, each of said link members being pivotally connected to the frame of the vehicle at one end thereof and to the steering knuckle at an opposite end thereof, said link members are so disposed as to set a transverse distance between a kingpin axis and a center of the wheel at a positive value wherein the kingpin axis is located inside of the center of the wheel in relation to a transverse direction of the vehicle and maximize the distance when the wheel is turned at a predetermined angle toward an inward direction wherein the wheel is located radially inwardly in relation to a turning circle, and said lower arm comprises said two link members;

one of the link members being disposed in a transverse direction;

the other link member being disposed obliquely in a longitudinal direction;

the two link members being disposed such that a portion of an axis of the transversely disposed link member extended to an outside of the vehicle crosses a portion of an axis of the longitudinally and obliquely disposed link member extended to the outside of the vehicle in a plan view of the disposition of the link members;

the longitudinally and obliquely disposed link member being located in front of the cross point; and a connection point of the longitudinally and obliquely disposed link member with the steering knuckle overlapping the axis of the transversely disposed link member int he plan view of the disposition of the link members when the wheel is turned at a predetermined angle toward an inward direction wherein the wheel is located radially inwardly in relation to a turning circle.

* * * * *